US009848451B2

(12) United States Patent
Schafer

(10) Patent No.: US 9,848,451 B2
(45) Date of Patent: Dec. 19, 2017

(54) APPARATUS AND METHOD FOR WIRELESS CONNECTION OF DEVICES

(71) Applicant: Frank Rene Schafer, Kerpen (DE)

(72) Inventor: Frank Rene Schafer, Kerpen (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 14/991,105

(22) Filed: Jan. 8, 2016

(65) Prior Publication Data
US 2016/0381721 A1 Dec. 29, 2016

(30) Foreign Application Priority Data

Jan. 12, 2015 (DE) .................. 10 2015 100 313

(51) Int. Cl.
H04L 29/06 (2006.01)
H04W 12/06 (2009.01)
H04W 76/02 (2009.01)
G08C 17/02 (2006.01)
H04Q 9/00 (2006.01)
H04L 29/08 (2006.01)

(52) U.S. Cl.
CPC .......... H04W 76/021 (2013.01); G08C 17/02 (2013.01); H04L 63/0884 (2013.01); H04Q 9/00 (2013.01); H04W 12/06 (2013.01); H04L 67/12 (2013.01); H04Q 2209/40 (2013.01)

(58) Field of Classification Search
CPC ..... H04L 67/12; H04L 63/0884; G08C 17/02; H04Q 2209/40; H04Q 9/00; H04B 5/00; H04W 4/008; H04W 76/021; H04W 12/06; H04M 1/72522; H04M 2250/12; H04M 1/72569; H04N 2201/3273; H04N 1/00307
See application file for complete search history.

(56) References Cited

U.S. PATENT DOCUMENTS

| 2007/0188323 | A1 | 8/2007 | Sinclair et al. |
| 2009/0153342 | A1 | 6/2009 | Thorn |
| 2011/0126014 | A1 | 5/2011 | Camp, Jr. et al. |
| 2011/0183706 | A1* | 7/2011 | Jung ................. H04M 1/72522 455/550.1 |
| 2012/0190299 | A1* | 7/2012 | Takatsuka ................ H04B 5/00 455/41.1 |

FOREIGN PATENT DOCUMENTS

| WO | 2010/023459 A1 | 3/2010 |
| WO | 2013098262 A1 | 7/2013 |

* cited by examiner

Primary Examiner — Ping Hsieh
Assistant Examiner — James Yang
(74) Attorney, Agent, or Firm — Dickinson Wright PLLC

(57) ABSTRACT

Disclosed herein is a system and method for wireless connection of at least a first device to at least a second device. The devices are each configured with a sensor for receiving a signal, a data connection element for providing a data transmission channel between the devices, and a control element. The devices each have a timing device for determining the time of reception, with the timing devices can be activated with the reception of the signal. The timing devices are started with the reception of the signal. Furthermore, the devices are configured to record the signal received by the sensor and the time of reception of the signal and to provide to each other the signals received by the sensors and the times of reception of the signals, to compare them with each other and to use them as an identification feature.

9 Claims, 2 Drawing Sheets

APPARATUS AND METHOD FOR WIRELESS CONNECTION OF DEVICES

CROSS-REFERENCE TO RELATED APPLICATIONS

This patent application claims priority to German Patent Application No. DE10 2015 100 313 9, filed Jan. 12, 2015, entitled "Arrangement and method for wireless connection of devices," the entire disclosure of the application being considered part of the disclosure of this application and hereby incorporated by reference.

BACKGROUND

The invention concerns an arrangement for the wireless connection of at least two devices, each being configured with a sensor for receiving a signal, a data connection element for providing a data transmission channel between the devices, and a control element.

The invention moreover concerns a method for the wireless connection of the devices.

Electronic devices known to the prior art are configured to communicate with each other and mutually provide various functions to each other. For the exchanging of functions with each other and for the joint execution of the functions, the devices need to be coupled, electronically connected and brought to communicate with each other so that the devices recognize each other in order to function together.

The functions provided by the devices to each other involve, for example, the establishing of a telephone connection, the providing of a microphone or a loudspeaker or a voice recognition, as well as the transmittal of music files and the playing of music.

Traditional electronic devices are joined together by electrical cables. The inserting of the cable into the device is an act of will power of the user to connect the devices. The devices recognize each other via the cable connection.

In known environments with a wireless connection, a plurality of devices are usually situated in the reception range of each individual device, but not every device can communicate with every other device, nor is this desired.

In wireless connections, the devices each time are manually connected to each other by a menu. The selection of the desired device occurs through a list provided with devices recognized from the surroundings. The list contains devices which are unknown, incomprehensible and meaningless for a desired connection, especially device names or designations from which the connection partner needs to be selected.

After the selection of the desired device and the making of the connection, various connection options need to be set in the devices. Furthermore, the functions being executed can be selected from another list.

Wireless connections of devices are likewise known from the prior art, wherein the devices for the connection are placed in contact with each other, moved together, shaken or pushed against each other.

A device connection is described in US 2012/0190299 A1 in which a control unit and the devices being connected to the control unit are stacked one on the other or placed in contact one on the other. In the control unit, data of certain vibration waveforms generated by touching the housing are stored as reference data. The wireless connection of the devices is based consequently on the detecting and recognizing of vibrations with different yet distinct waveforms that are sent out by the devices being connected to the control unit. The recognized vibration waveforms are sent back as signals to the control unit, compared in the control unit, and if they agree with at least one stored vibration waveform the devices are connected to each other.

A method for initiating a wireless data exchange between two devices is presented by WO 2010/23459 A1. The devices each have a sensor for recognizing an impact or a vibration. Each device recognizes a vibration produced by another device and receives the data characterizing the vibration, which is exchanged between them. After a comparison of the data produced by the vibration with the data received and the recognizing of a mutual impact in this way, the devices are connected for a data exchange. The impact on the housings of the devices is transmitted as sonic waves to the sensor, which are in turn recorded by the sensor.

WO 2013/98262 A1 pertains to a wireless connection system for the transmission of audio signals in which at least two of three devices are each configured with a microphone. The transmittal of the audio signals is triggered when the two devices having a microphone are pushed against each other and the microphones recognize the resulting impact noises at the same time.

US 2011/0126014 A1 discloses a wireless connection of devices in which the devices are stimulated to make contact with each other by a physical event, such as being pushed together. The collision generates and sends out a noise, which is received by the devices being connected and processed as a signal via microphones. Furthermore, information as to the time of the physical event is exchanged between the devices, which is likewise used for the authentication of the devices. After a successful authentication, the devices are connected together.

In the systems for wireless connection of devices that are known in the prior art the selection of the desired device entering into the connection is done on the one hand through lists with devices recognized from the surroundings, which contain devices which are unknown to the user and incomprehensible, and of no meaning to the desired connection.

Furthermore, many functions of the devices remain unused, since the perceived learning effort to operate the devices seems quite tedious to the user and distracts him from his primary interest. For example, the presentation of content of a tablet PC on a television set is used little if at all, since the users are unfamiliar with the settings of the television set and/or the tablet PC. The same is true of speakerphone devices in an automobile or a contact data transmittal between mobile telephones.

On the other hand, the devices are wirelessly connected after a generating and comparing of signals, where the comparison of the signals is very uncertain, so that the providing of the desired connection of the devices may be defective, for example, if the signals deviate from the signals which are stored. Furthermore, signals needs to be stored, which makes the connection cumbersome.

SUMMARY

The problem which the invention proposes to solve is the providing of electronic devices or appliances and a method for the wireless connection of the electronic devices with a minimal authorization process. The devices should be securely connected to each other in simple fashion once the respective communication readiness has been recognized and established, with the authorization occurring by a user as a third party. The user should not need to have any knowledge of various connection techniques and functions, such as time-consuming selection from lists with encrypted names of the devices or manual entry of different codes. The necessary handling to make the connection should be intuitive and simple. It should be ensured that only those devices are connected to each other which are required by the communication at the particular time and with the desired function.

The problem is solved by the objects and methods with the features of the independent patent claims. Further modifications are indicated in the dependent patent claims.

The problem is solved by an arrangement according to the invention for wireless connection of at least a first device to at least a second device. The devices are each configured with a sensor for receiving a signal, a data connection element for providing a data transmission channel between the devices, and a control element.

According to the concept of the invention, the devices each have a timing device for determining the time of reception and/or the time course of the signal, wherein the timing devices can be activated with the reception of the signal. The timing devices are started with the reception of the signal.

The devices according to the invention are configured on the one hand to record the signal received by the sensors and the time of reception of the signal and/or the time course of the received signal and on the other hand to provide to each other the signals received by the sensors and the times of reception of the signals and/or the time courses of the signals received, to compare them with each other and to use them as an identification feature.

The received signals can be detected and recorded as recognition features or identification features.

According to a preferred embodiment of the invention, the devices are configured such that they send function offers and function requests and receive them from another device, compare them with their own function offers and function requests, accept the function offers and function requests received, and maintain the wireless connection between the devices after the acceptance.

According to one modification of the invention, the sensor is configured to receive audio signals or video signals or heat or a vibration.

One advantageous configuration of the invention consists in the first device being configured as a movable object and the second device being configured as a movable or stationary object.

The signal being received by the devices each time is preferably the outcome of a physical event, such as a vibration or the noise produced by a vibration, such as an impact. For example, due to a physical collision of two devices a wireless connection is initiated between the devices as a function provider or a function user. It is possible to connect together two devices, such as a mobile telephone and an entry terminal, in order to make possible the use of the functions of the devices by a user. The devices recognize their mutual connection readiness and determine which function are accepted or desired each time.

The problem is also solved by a method according to the invention for the wireless connection of devices. The method has the following steps:

generating of a receivable signal for initiating a connection process,
receiving of the signal by means of a sensor and simultaneous starting of a timing device as well as acceptance of the signal,
connecting of the devices via an open data transmission channel as a wireless connection,
sending, receiving and comparing of the time-dependent signals,
recognition of the devices as ready-to-connect objects and maintenance of the wireless connection, otherwise closing of the data transmission channel and breaking of the wireless connection,
sending of at least one message, which contains at least one function offer or a function request,
selection of one function offered by the other device in connection with the device,
acceptance of the function in the other device in connection with the device and
sending and receiving of data between the devices to execute the function.

According to a preferred embodiment of the invention, the comparing of the time-dependent signals is referenced to absolute time. By absolute time is meant a time point.

According to one modification of the invention, the comparing of the time-dependent signals is referenced to a defined time period. By defined time period is meant a time course such that the signal received over a period of time and thus the time course of the signal are used.

Another advantageous embodiment of the invention consists in that the signal which can be received for the initiating of the connection process is based on a vibration.

The signal which can be received for the initiating of the connection process is advantageously generated as an audio signal.

According to an alternative embodiment of the invention, the signal which can be received for the initiating of the connection process is advantageously generated as a video signal.

The arrangement according to the invention and the method according to the invention in summary have various benefits:

no difficult selection from a list for the wireless connection of devices and the transmission of functions,
recording and comparing of the signals generated to establish the connection by devices located in the surroundings and secure and distinct connecting of the desired devices.

Further details, features and advantages of configurations of the invention will emerge from the following description of sample embodiments with reference to the corresponding drawings. There are shown:

DETAILED DESCRIPTION

Figure 1A:
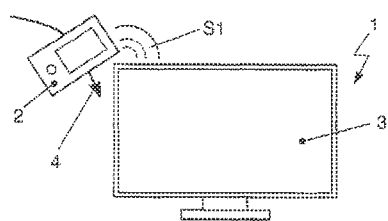
FIG. 1a, 1b illustrates a system for the wireless connection of two devices according to the aspects disclosed herein.
Figure 1B:
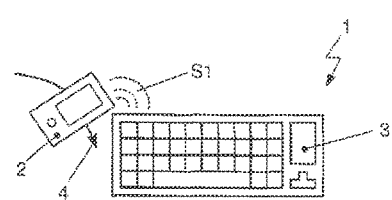

FIGS. 1a and 1b illustrate a system (or arrangement 1) for wireless connection of two devices 2, 3. The arrangements 1 each comprise a first device 2 and a second device 3, representing a provider or a consumer of functions. In general, a device 2, 3 can be a provider and a consumer at the same time.

The first device 2 is configured as a sender or provider of at least one function, and furthermore in particular as a movable object. The second device 3 is configured as a receiver and can be a movable or a stationary object. The devices 2, 3 are configured so as to receive a detectable signal 4. The second device 3 per FIG. 1a is configured for example as a monitor or TV set and that of FIG. 1b as a radio set.

In order to initiate the communication between the devices 2, 3, the first device 2 makes contact with the second device 3. The contact is requested by generating a receivable signal S1 in the form of a vibration. For this, the first device 2 is pushed against the second device 3. As a result of the abrupt shaking or collision of the first device 2 against the second device 3, a noise is produced, which can be recognized, recorded and further processed by the second device 3.

The producing of the vibration or noise, similar to a tapping, corresponds to a mutual reporting of the devices 2, 3 or a reporting of the first device 2 to the second device 3 by means of a special physical event by a user. The physical event thus initiates a connection process, wherein the devices 2, 3 recognize each other and offer functions to each other. As long as one of the devices 2, 3 recognizes the other device 3, 2 as a connection partner and accepts one of the functions offered, a connection is maintained between the function-requesting device 2, 3 and the function-offering device 3, 2. Each of the devices 2, 3 here can be configured as requesting the function and/or offering the function.

As a result of the tapping of the first device 2 on the second device 3, the user generates the signal S1 which is receivable by the two devices 2, 3. With the help of the receivable signal S1, a unit internal to the device is told that the first function-offering device 2 and the second function-requesting device 3 are to be connected each with the other device 2, 3, which is to be understood as a first authorization by the user.

Figure 2:
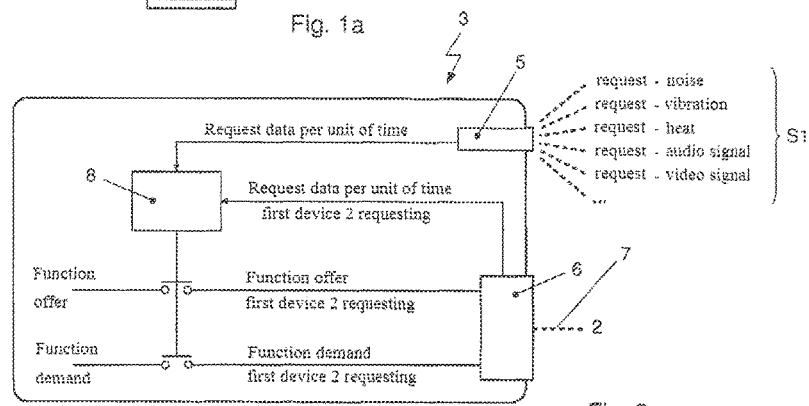
FIG. 2 illustrates an example of a device for wireless connection to a second device according to the aspects disclosed herein.

FIG. 2 shows a second device 3 for wireless connection to a first device 2, not shown. The wireless connection is represented by the data transmission channel 7, at the end of which the device 2 is suggested.

A sensor 5 receives the signal S1 sent out by the first device 2 for the making of the wireless connection, which is generated as a request for the connection between the devices 2, 3. The signals S1 sent out can be audio signals or video signals, or signals which can be received by a heat sensor or a vibration sensor.

In order to prevent an unintended reaction from and connection with nonparticipating devices located in the vicinity, a time proximity to the physical event is used in the making of the wireless connection, such as the tapping as a vibration or noise, or even an exact time course of the signals S1 received by the sensor 5, that is, the audio, video, heat sensor or vibration sensor data. The signals S1 received by the sensor 5 are sent to a control element 8 in combination with the particular time of reception or the time course.

The second device 3 is furthermore in contact with the first device 2 via a data connection element 6 and the open data transmission channel 7. The devices 2, 3 moreover are configured so as to identify special message signals and relevant measurement data for the making of the wireless connection as well as descriptions of the functions offered and demanded, to route them to submodules and to process them. Thus, request data of the first device 2 transmitted through the open data transmission channel 7 to the data connection element 6 and referenced to a time unit or to the time course is likewise transmitted directly to the control element 8. At the same time, function offers and function demands of the requesting first device 2 that are received by the data connection element 6 are compared with function offers and function demands of the second device 3. The results of the comparisons of the function offers and the function demands are likewise relayed to the control element 8 for comparison of the data.

By a comparison of the data and signals processed in the second device 3 with the data and signals of the first device 2, it is determined whether the wireless connection between the function-offering first device 2 and the function-requesting second device 3 should be maintained. The wireless connection between the devices 2, 3 is produced if the counterpart device 2, 3 is identified as being the device 2, 3 involved in the tapping.

The wireless connection process does not rule out other interactions being offered and processed for the authorization of the functions between the devices 2, 3 to establish the connection.

Figure 3:
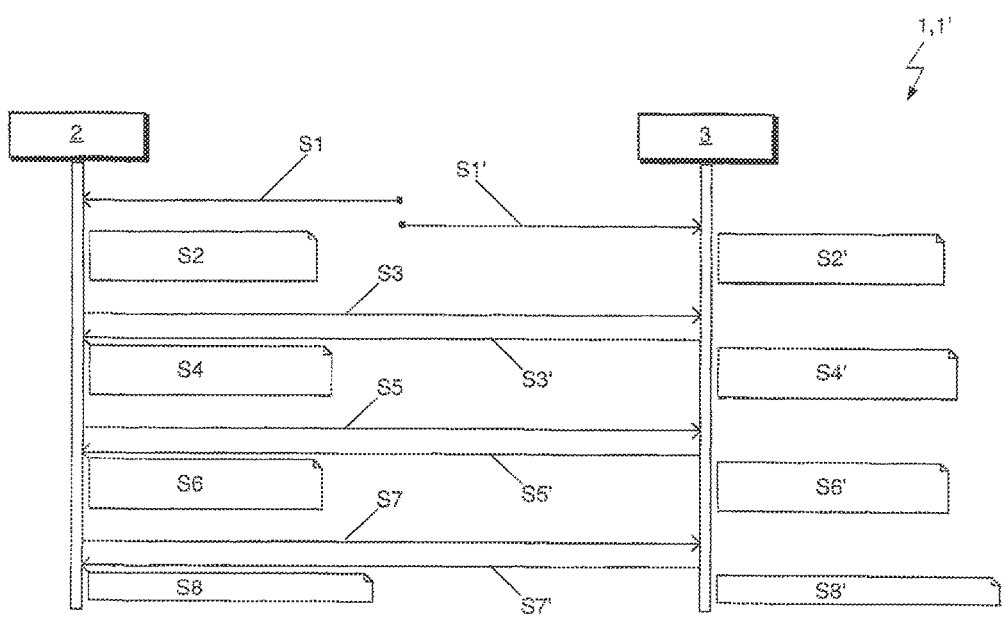
FIG. 3 illustrates an example of a sequence diagram of the arrangement for establishing the wireless connection of two devices according to the aspects disclosed herein.

FIG. 3 shows a sequence diagram of the arrangement 1 for establishing the wireless connection of the two devices 2, 3, such as a music player and a sound system of an automobile.

The vibration produced by the user, or driver of the automobile, by tapping the first device 2 against the second device 3, or the noise produced in this fashion, is received as a signal S1, S1' by the sensors 5 of the devices 2, 3. In this, the driver of the automobile will tap with the music player against the center console of the automobile, which is configured with the sound system. The devices 2, 3 are configured with sensors 5 and a software which detects the knocking together.

With the reception of the signal S1, S1', a timing device is started in the devices 2, 3. At the same time, the signal S1, S1' is recorded S2, S2' over a certain time period. Depending on the configuration, either the signal of the vibration itself or the noise produced with the vibration can be recorded as an audio signal.

Next, the devices 2, 3 are coupled together by connection S3, S3' via the data transmission channel 7 and data such as the received signals S1, S1' is sent and received mutually in dependence on the absolute time or the defined time period and also compared with each other.

With the help of the comparison of the mutually transmitted signals S1, S1', the devices 2, 3 are recognized S4, S4' as ready-to-connect objects, which are in immediate proximity to each other and which are demanding a connection. If the immediate proximity of the two devices 2, 3 and the demand for a connection are recognized, the connection will be established.

Other devices, such as a game console, can also perceive and receive the knocking noise. However, the other devices are able to recognize, by means of the recording of the signals at an absolute time or over a certain time period, that they are not both involved in the knocking process. Thanks to the comparison of the time-related data of the vibration signal or the audio signal, it is recognized that the knocking process for example occurred 4 ms later in the game console than in the respective devices 2, 3, corresponding to a distance of the game console of around 1.5 m from the devices 2, 3. This rules out the process of a direct knocking. No connection will be established between the game console and one of the devices 2, 3.

Next comes a sending S5, S5' of at least one message between the devices 2, 3, the message containing at least one function offer or one function request. For example, the music player of the driver of the automobile and the sound system of the center console authorize a comparison of the functions, wherein the music player sends information on the possibility of transmitting music data to the sound system and is not itself interested in any function of the sound system.

Then comes a selection S6, S6' of a function offered by the respective counterpart device 2, 3. After the selection S6, S6' of the offered function, there is a requesting or accepting S7, S7' of the function in the respective counterpart device 2, 3.

Thus, the sound system reports interest in the function of transmittal of music data. The music player and the sound system remain connected. The music player is displayed to the driver of the automobile via a display device present in the automobile and given the option to play the respective contents.

As a consequence of the acceptance S7, S7' of the function offered, a sending S8, S8' of data commences between the devices 2, 3 to execute the desired function.

In similar fashion, keypads and mice can be connected to computers, or computers to each other.

The invention claimed is:

1. A system for wireless connection, comprising:
a first device;
a second device, the first device and the second device each configured with a sensor for receiving a signal, a data connection element for providing a data transmission channel between the devices, and a control element, characterized in that wherein
the first device and the second device each have a timing device for determining the time of reception, wherein the timing devices each are configured to be activated with a reception of the signal, and
the first device and the second device are further configured:
to record the signal received by the sensor and the time of reception of the signal,
to provide to each other signals received by the sensors and the times of reception of the signals, and
to compare them with each other for identification,
wherein the first device is configured as a movable object and the second device is configured as a movable or stationary object.

2. The system according to claim 1, wherein the devices are configured to:
send function offers and function requests and receive function offer and function requests from another device,
compare the function offers and function requests received with their own function offers and function requests,
accept the function offers and function requests received, and
maintain a wireless connection between the devices after the acceptance.

3. The system according to claim 1, wherein the sensor is configured to receive audio signals, video signals, heat, or a vibration.

4. A method for wireless connecting of devices, comprising:
generating of a receivable signal for initiating a connection process;
receiving of the signal by a sensor and simultaneous starting of a timing device as well as recording of the signal;
connecting of the devices via an open data transmission channel as a wireless connection;
sending, receiving and comparing of time-dependent signals;
recognizing the devices as ready-to-connect objects and maintenance of the wireless connection, an in response to a non-recognition, closing of the data transmission channel and breaking of the wireless connection,
sending of at least one message, which contains at least one function offer or a function request,
selecting of a function offered by one of the devices in connection with the other one of the devices,
acceptance of the function in the other device in connection with the other one of the devices, and
sending and receiving of data between the devices to execute the function, wherein the devices are defined by at least a first device and a second device, and the first device is configured as a movable object and the second device is configured as a movable or stationary object.

5. The method according to claim 4, wherein the comparing of the time-dependent signals is referenced to absolute time.

6. The method according to claim 4, wherein the comparing of the time-dependent signals is referenced to a defined time period.

7. The method according to claim 4, wherein the signal which can be received for the initiating of the connection process is based on a vibration.

8. The method according to claim 4, wherein the signal which can be received for the initiating of the connection process is generated as an audio signal.

9. The method according to claim 4, wherein the signal which can be received for the initiating of the connection process is generated as a video signal.

* * * * *